Nov. 4, 1930.  W. R. HEWITT  1,780,675
BOLT AND NUT LOCK
Filed Jan. 16, 1929
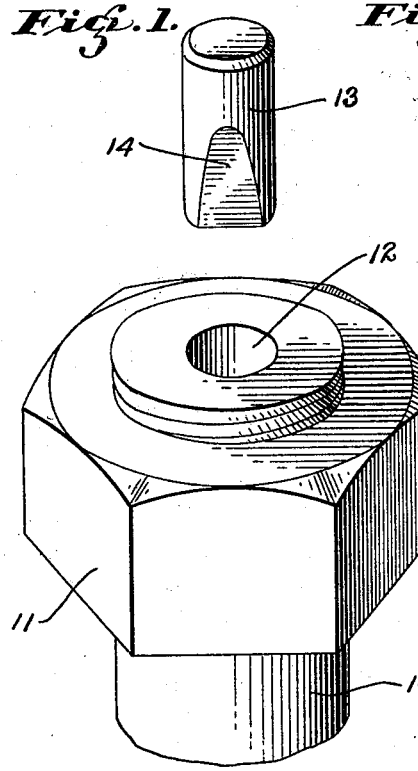
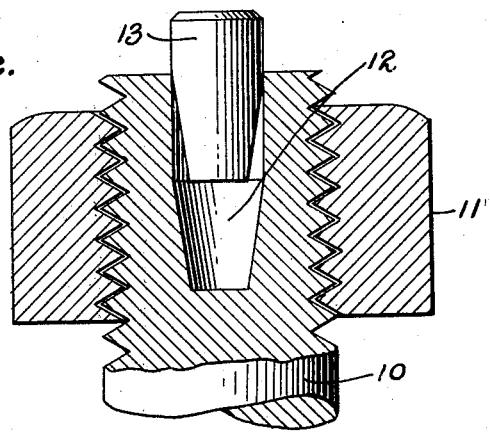
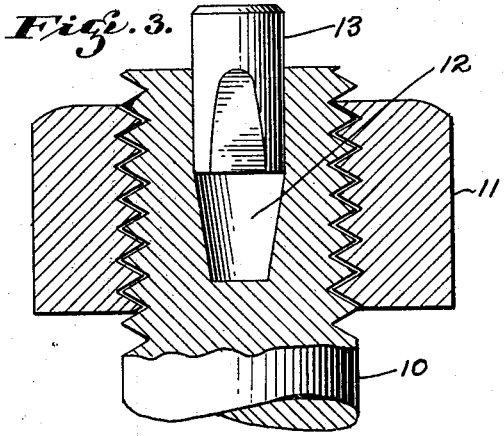
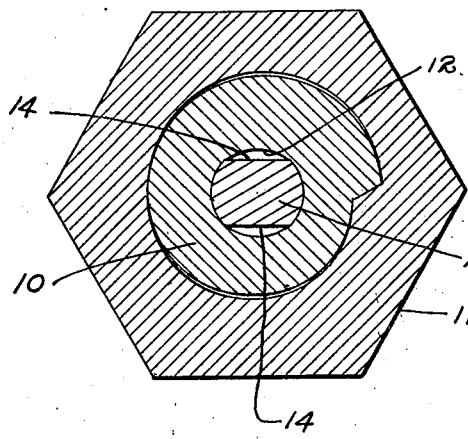
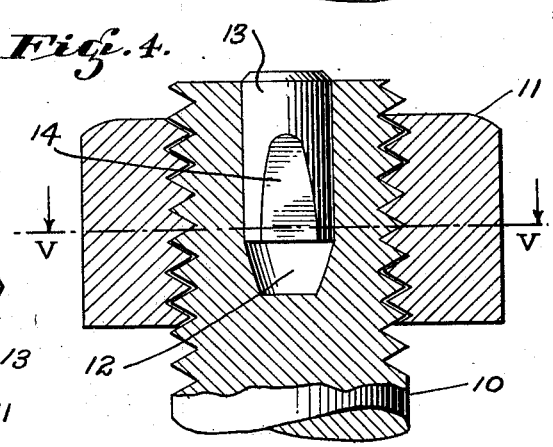
INVENTOR.
William R. Hewitt
BY
Townsend, Loftus & Abbett
ATTORNEYS.

Patented Nov. 4, 1930

1,780,675

UNITED STATES PATENT OFFICE

WILLIAM R. HEWITT, OF NEW YORK, N. Y.

BOLT AND NUT LOCK

Application filed January 16, 1929. Serial No. 332,757.

My present invention relates to a bolt and nut lock and more particularly to one wherein the nut locking means is permanently carried by the bolt.

An object of my invention is to provide a simple, effective and efficient nut locking means for bolts and the like.

Another object of my invention is to provide a nut locking means for bolts which may be mounted upon and securely held by the bolt.

A further object of my invention is to provide a nut locking means for bolts which will distort the bolt along one axis and thus prevent a removal of the nut.

Another object of my invention is to provide in combination with a bolt having a cylindrical hole in the end thereof, a nut locking plug which will completely fill said cylindrical hole and expand the bolt along one axis when rendered operative.

A great many nut locking devices have been devised in the past, but so far as I am aware, the only devices of this character which are in any manner similar in construction to my present locking means are those wherein the bolt has been provided with an axially extending opening into which either a tapered plug or an over-size, cylindrical plug has been driven. In these cases the driving of the plug into the axial opening functions to expand the bolt uniformly into tight engagement with the nut. This expansion does, of course, tighten the engagement of the nut upon the bolt, but it does not prevent a removal of the nut even under these conditions, as it is then only necessary to apply a greater force to turn the nut off. As an improvement upon nut locking devices of this character, I propose to provide a nut locking plug of such a character that it will, in cooperation with the particular shape of opening with which it cooperates, function to distort the bolt along one axis and, as a result, render it, and possibly the nut, elliptical so that the two will be firmly locked against a relative turning movement therebetween.

For a better understanding of my invention, reference should be had to the accompanying drawing wherein I have shown by way of illustration a preferred embodiment thereof.

In this drawing—

Fig. 1 is a perspective view of a bolt and nut showing the plug as removed therefrom, Fig. 2 is a fragmentary, sectional view of a bolt and nut showing the locking plug in its normal inoperative position, Fig. 3 is a view similar to Fig. 2 taken along a plane at right angles to that of Fig. 2, Fig. 4 is a view similar to Fig. 3 showing the nut locking plug as driven into its nut locking position, and Fig. 5 is a sectional view taken along line V—V of Fig. 4, looking in the direction of arrows, showing the elliptical configuration of the bolt when the locking plug is operative.

In the drawing I have designated the bolt by the numeral 10 and a suitable nut therefor by the numeral 11. The bolt 10 is shown as being provided with an opening 12 in the end thereof which extends axially to a depth corresponding to the working threads of the bolt and a suitable plug 13 is also shown as fitted within the opening 12. The axially extending opening 12 in the end of the bolt 10 is shown as cylindrical throughout a portion of its depth and tapering throughout the remaining portion of its depth. The plug 13 is of such a diameter that it will fit snugly within the cylindrical portion of the opening 12 and be thus securely held therein against displacement when not in operation. It will also be noted that the inner end of the plug 13 is cut away on opposite sides to form oppositely disposed flat surfaces 14 which, in effect, render the cross section of the inner end of the plug 13 more or less elliptical. At this point it should be noted that the portion of the plug 13 lying between the flat surfaces 14 still retains its cylindrical contour so that, when these portions of the cylindrically disposed surfaces of the plug 13 are driven into the tapering portion of the hole 12, they will expand the bolt along one axis and distort its threads and possibly those of the nut into an elliptical shape and thus prevent a turning of the nut upon the bolt.

In carrying out my invention I propose to so proportion the diameter of the opening 12 with respect to the diameter of the bolt that no unnecessary weakening thereof will result and a certain predetermined factor of safety will be obtained. The cylindrical portion of the hole 12 is of such a depth that it will engage a sufficient length of the plug 13 to securely hold it in its inoperative position within the end of the bolt without its becoming loosened and lost, and the tapered portion at the bottom of the hole 11 is so located that it will expand the bolt at a point adjacent the working threads thereof, this point being preferably intermediate the top and bottom surfaces of the nut so that when the plug is driven home it will upset the circular cross section of the tapered portion of the opening 12 and thus expand the bolt and its threads substantially elliptically into tight engagement with the nut 11.

From the above it will be seen that when the inner or elliptical end of the plug 13 is driven into the cylindrical, tapered portion of the hole 12, the bolt will be extended along one diametrically extending plane and, as a result, contracted along a second plane at right angles to the first. This contraction of the bolt along this second plane is, as will be readily understood, provided for by the cutting away of the plug 13, as previously described, so as to form the inclined surfaces 14.

The particular outstanding features of my invention which I consider of sufficient importance to warrant further comment are in the particular design and fit of the plug within the cylindrical portion of the hole 12 so that the bolt and nut locking plug 13 may be assembled and sold as a unit irrespective of the type of nut which is to be used therewith. A further feature of novelty of my improved lock is also thought to reside in the particular shape of my improved plug which will, as has been stated above, expand the bolt along one plane and thus render it elliptical in cross section, as, by thus rendering the bolt elliptical in cross section in this manner, a more secure locking between the nut and bolt will be obtained than would be the case if the bolt were expanded cylindrically in accordance with the disclosures of the prior art.

The operation of my improved nut locking device is comparatively simple and can be described as follows: It will be assumed that the bolt has been previously equipped with the axially extending opening 12 into which the plug 13 is already tightly seated and projecting outwardly, as illustrated in Figs. 2 and 3 of the drawing. Taking the bolt and the locking plug as assembled in this manner, the bolt will be applied to the particular work intended and the nut 11 will then be threaded upon the bolt in the ordinary manner. After the nut has been turned up to a sufficient tightness, the mechanic can then lock it upon the bolt 10 by simply driving the plug 13 into the opening 12 flush with the end of the bolt, as illustrated in Fig. 4 of the drawing.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. A nut and bolt locking means comprising a threaded bolt provided with a cylindrical opening having a conical bottom portion formed in the end thereof, a nut for said bolt, and a plug adapted to be held by the cylindrical portion of said opening and driven into the conical portion of the opening to expand said bolt, said plug being cylindrical throughout a portion of its length and of a substantially elliptical cross-section at its inner end whereby when the plug is driven into the conical portion of said opening the bolt will be expanded along one axis to thereby lock said nut against turning upon said bolt.

2. A bolt and nut locking means comprising a threaded bolt having an opening extending axially into the end thereof, said opening being cylindrical for a portion of its depth and tapering throughout the remaining portion of its depth, and a plug adapted to fit tightly within the cylindrical portion of said opening and be thus held within the end of the bolt with its end projecting outwardly, and means whereby said plug when driven into the tapering portion of said opening will expand the bolt along one axis and cause it to contract on its other axis.

WILLIAM R. HEWITT.